(12) United States Patent
Tierling

(10) Patent No.: US 6,683,437 B2
(45) Date of Patent: Jan. 27, 2004

(54) CURRENT CONTROLLED MOTOR AMPLIFIER SYSTEM

(75) Inventor: Kollin Tierling, Milpitas, CA (US)

(73) Assignee: Immersion Corporation, San Jose, CA (US)

( * ) Notice: Subject to any disclaimer, the term of this patent is extended or adjusted under 35 U.S.C. 154(b) by 88 days.

(21) Appl. No.: 10/000,662

(22) Filed: Oct. 31, 2001

(65) Prior Publication Data

US 2003/0080710 A1 May 1, 2003

(51) Int. Cl.$^7$ ................................................. H02P 5/28
(52) U.S. Cl. ........................ 318/811; 318/594; 318/280; 318/801; 318/800; 318/798; 318/829
(58) Field of Search ................................. 318/811, 594, 318/254, 280, 801, 800, 798; 388/829, 828, 811; 360/78.12

(56) References Cited

U.S. PATENT DOCUMENTS

| | | |
|---|---|---|
| 3,157,853 A | 11/1964 | Hirsch |
| 3,220,121 A | 11/1965 | Culter |
| 3,497,668 A | 2/1970 | Hirsch |
| 3,517,446 A | 6/1970 | Corlyon et al. |
| 3,623,064 A | 11/1971 | Kagan |
| 3,902,687 A | 9/1975 | Hightower |
| 3,903,614 A | 9/1975 | Diamond et al. |
| 3,911,416 A | 10/1975 | Feder |
| 4,160,508 A | 7/1979 | Frosch et al. |
| 4,236,325 A | 12/1980 | Hall et al. |
| 4,513,235 A | 4/1985 | Acklam et al. |
| 4,581,491 A | 4/1986 | Boothroyd |
| 4,599,070 A | 7/1986 | Hladky et al. |
| 4,708,656 A | 11/1987 | de Vries et al. |
| 4,713,007 A | 12/1987 | Alban |
| 4,794,392 A | 12/1988 | Selinko |
| 4,891,764 A | 1/1990 | McIntosh |
| 4,930,770 A | 6/1990 | Baker |
| 4,934,694 A | 6/1990 | McIntosh |
| 5,019,761 A | 5/1991 | Kraft |
| 5,022,407 A | 6/1991 | Horch et al. |
| 5,035,242 A | 7/1991 | Franklin et al. |
| 5,038,089 A | 8/1991 | Szakaly |
| 5,078,152 A | 1/1992 | Bond et al. |
| 5,212,473 A | 5/1993 | Louis |
| 5,240,417 A | 8/1993 | Smithson et al. |
| 5,271,290 A | 12/1993 | Fischer |
| 5,275,174 A | 1/1994 | Cook |
| 5,299,810 A | 4/1994 | Pierce et al. |

(List continued on next page.)

FOREIGN PATENT DOCUMENTS

EP  0 349 086 A1  1/1990

OTHER PUBLICATIONS

Baigrie, "Electric Control Loading—A Low Cost, High Performance Alternative," *Proceedings of Interservice/Industry Training Systems Conference*, pp. 247–254, Nov. 6–8, 1990.

(List continued on next page.)

*Primary Examiner*—Karen Masih

(57) ABSTRACT

Aspects of a current controlled motor amplifier system are provided. These aspects include a current source motor amplifier comprising current source means on each leg of a top half of the H bridge configuration and switching means on each leg of a bottom half of the H bridge configuration. A motor is coupled to the current source motor amplifier at a center portion of the H bridge configuration. Control circuitry is coupled to the current source motor amplifier for controlling the switching on of the current source motor amplifier for a predetermined time to operate the top half of the H bridge configuration essentially as a linear constant current source and the bottom half of the H bridge configuration in switching mode. The aspects also allow for simplified circuitry to protect against overvoltage conditions and eliminate electrical damping in applications with higher rotational velocities associated with induced back EMF.

29 Claims, 4 Drawing Sheets

U.S. PATENT DOCUMENTS

| | | | |
|---|---|---|---|
| 5,309,140 A | 5/1994 | Everett, Jr. et al. | |
| 5,334,027 A | 8/1994 | Wherlock | |
| 5,466,213 A | 11/1995 | Hogan et al. | |
| 5,547,382 A | 8/1996 | Yamasaki et al. | |
| 5,766,016 A | 6/1998 | Sinclair et al. | |
| 5,785,630 A | 7/1998 | Bobick et al. | |
| 5,838,515 A * | 11/1998 | Mortazavi et al. | 360/78.12 |
| 6,456,024 B1 | 9/2002 | Schmider et al. | |

OTHER PUBLICATIONS

Iwata, "Pen–based Haptic Virtual Environment," 0–7803–1363–1/93 IEEE, pp. 287–292, 1993.

Russo, "The Design and Implementation of a Three Degree of Freedom Force Output Joystick," *MIT Libraries Archives* pp. 1–131, May 1990, archived Aug. 14, 1990.

Brooks et al., "Hand Controllers for Teleoperation—A State–of–the–Art Technology Survey and Evaluation," *JPL Publication 85–11*, NASA–CR–175890; N85–28559, pp. 1–84, Mar. 1, 1985.

Jones et al., "A perceptual analysis of stiffness," ISSN 0014–4819 Springer International (Springer–Verlag); *Experimental Brain Research*, vol. 79, No. 1, pp. 150–156, 1990.

Burdea et al., "Distributed Virtual Force Feedback, Lecture Notes for Workshop on Force Display in Virtual Environments and its Application to Robotic Teleoperation," *1993 IEEE International Conference on Robotics and Automation*, pp. 25–44, May 2, 1993.

Snow et al., "Model–X Force–Reflecting–Hand–Controller," NT Control No. NPO–17851; JPL Case No. 7348, pp. 1–4 with 45 pages of attachments, Jun. 15, 1989.

Ouh–Young, "Force Display in Molecular Docking," Doctoral Dissertation, University of North Carolina at Chapel Hill, UMI Order No. 9034744, p. 1–369, 1990.

Tadros, "Control System Design for a Three Degree of Freedom Virtual Environment Simulator Using Motor/Brake Pair Actuators," *MIT Archive*, pp. 1–88, Feb. 1990, archived Aug. 13, 1990.

Caldwell et al., "Enhanced Tacile Feedback (Tele–Taction) Using a Multi–Functional Sensory System," 1050–4729/93, pp. 995–960, 1993.

Adelstein et al., "Design and Implementation of a Force Reflecting Manipulandum for Manual Control research," DSC–vol. 42, *Advances in Robotics*, pp. 1–12, 1992.

Gotow et al., "Controlled Impedance Test Apparatus for Studying Human Interpretation of Kinesthetic Feedback," WA11–11:00, pp. 332–337.

Stanley et al., "Computer Simulation of Interacting Dynamic Mechanical Systems Using Distributed Memory Parallel Processors," DSC–vol. 42, *Advances in Robotics*, pp. 55–61, ASME 1992.

Russo, "Controlling Dissipative Magnetic Particle Brakes in Force Reflective Devices," DSC–vol. 42, *Advances in Robotics*, pp. 63–70, ASME 1992.

Kontarinis et al., "Display of High–Frequency Tactile Information to Teleoperators," *Telemanipulator Technology and Space Telerobotics*, Won S. Kim, Editor, Proc. SPIE vol. 2057, pp. 40–50, Sep. 7–9, 1993.

Patrick et al., "Design and Testing of A Non–reactive, Fingertip, Tacile Display for Interaction with Remote Environments," *Cooperative Intelligent Robotics in Space*, Rui J. DeFigueiredo et al, Editor, Proc. SPIE vol. 1387, pp. 215–222, 1990.

Adelstein, "A Virtual Environment System For The Study of Human Arm Tremor," *Ph.D. Dissertation*, Dept. of Mechanical Engineering, MIT, Jun. 1989, archived Mar. 13, 1990.

Bejczy, "Sensors, Controls, and Man–Machine Interface for Advanced Teleoperation," *Science*, vol. 208, No. 4450, pp. 1327–1335, 1980.

Bejczy et al., "Generalization of Bilateral Force–Reflecting Control of Manipulators," *Proceedings of Fourth CISM–IFToMM*, Sep. 8–12, 1981.

McAffee et al., "Teleoperator Subsystem/Telerobot Demonstrator: Force Reflecting Hand Controller Equipment Manual," *JPL* 1988, JPL D–5172.

Minsky, "Computational Haptics: The Sandpaper System for Synthesizing Texture for a Force–Feedback Display," *Ph.D. Dissertation*, MIT, Jun. 1995, archived Jul. 6, 1995.

Jacobsen et al., "High Performance, Dextrous Telerobotic Manipulator With Force Reflection," *Intervention/ROV '91 Conference & Exposition*, Hollywood, Florida, May 21–23, 1991.

Shimoga, "Finger Force and Touch Feedback Issues in Dexterous Telemanipulation," *Proceedings of Fourth Annual Conference on Intelligent Robotic Systems for Space Exploration*, Rensselaer Polytechnic Institute, Sep. 30–Oct. 1, 1992.

IBM Technical Disclosure Bulletin, "Mouse Ball–Actuating Device With Force and Tactile Feedback," vol. 32, No. 9B, Feb. 1990.

Terry et al., "Tactile Feedback In A Computer Mouse," *Proceedings of Fourteenth Annual Northeast Bioengineering Conference*, University of New Hampshire, Mar. 10–11, 1988.

Howe, "A Force–Relating Teleoperated Hand System for the Study of Tacile Sensing in Precision Manipulation," *Proceedings of the 1992 IEEE International Conference on Robotics and Automation*, Nice, France, May 1992.

Eberhardt et al., "OMAR—A Haptic display for speech perception by deaf and deaf–blind individuals," *IEEE Virtual Reality Annual International Symposium*, Seattle, WA, Sep. 18–22, 1993.

Rabinowitz et al., "Multidimensional tactile displays: Identification of vibratory intensity, frequency, and contractor area," *Journal of The Acoustical Society of America*, vol. 82, No. 4, Oct. 1987.

Bejczy et al., "Kinesthetic Coupling Between Operator and Remote Manipulator," *International Computer Technology Conference, The American Society of Mechanical Engineers*, San Francisco, CA, Aug. 12–15, 1980.

Bejczy et al., "A Laboratory Breadboard System For Dual–Arm Teleoperation," *SOAR '89 Workship, JSC*, Houston, TX, Jul. 25–27, 1989.

Ouhyoung et al., "A Low–Cost Force Feedback Joystick and Its Use in PC Video Games," *IEEE Transactions on Consumer Electronics*, vol. 41, No. 3, Aug. 1995.

Marcus, "Touch Feedback in Surgery," *Proceedings of Virtual Reality and Medicine The Cutting Edge*, Sep. 8–11, 1994.

Bejczy, et al., "Universal Computer Control System (UCCS) For Space Telerobots," CH2413–3/87/0000/0318501.00 1987 IEEE, 1987.

* cited by examiner

CURRENT CONTROLLED MOTOR AMPLIFIER SYSTEM

FIELD OF THE INVENTION

The present invention relates generally to a current controlled motor amplifier system.

BACKGROUND OF THE INVENTION

The conventional approach to transconductance or current controlled motor amplifier design includes current sensing, scaling, error amplification, compensation, and motor drive. One example of such an amplifier is shown in FIG. 1 in which T1, T2, T3, and T4 are solid-state switches (usually transistors), M is the electric motor (or one phase of the motor in the case of a multiphase motor), and I is the current in the motor. A reverse biased diode is connected to each switch. The upper and lower terminals of the H bridge are connected to maximum potentials.

The conventional approach is used specifically in areas where significant motor rotational velocities result in high motor back-EMF (electromagnetic force). By sensing the motor current, and developing a current signal proportional to the motor current, the instantaneous motor current can be compared with the commanded motor current. Any difference between the commanded and measured motor current is amplified as an error signal that is the command signal to the motor drive bridge. If the measured current is smaller than the commanded current, then the error signal will command a compensatory increase in motor current. In this way, the output current, and hence an output torque of the motor is proportional to the input command to the amplifier.

The conventional approach is usually well suited to driving motors over a wide range of loads and rotational velocities. A problem with the conventional approach is that it addresses a larger situation than that of the typical force-feedback application, such as wheel or joystick amplifiers in gaming applications, which tend to operate close to stall, or at comparatively low rotational velocities. The breadth of coverage in the conventional approach adds unnecessary complexity to the motor amplifier design for force-feedback applications.

Accordingly, what is needed is an approach to current controlled motor amplifier design that is less complex and more suitable for high fidelity force feedback applications.

SUMMARY OF THE INVENTION

Aspects of a current controlled motor amplifier system are provided. These aspects include a current source motor amplifier comprising current source means on each leg of a top half of the H bridge configuration and switching means on each leg of a bottom half of the H bridge configuration. A motor is coupled to the current source motor amplifier at a center portion of the H bridge configuration. Control circuitry is coupled to the current source motor amplifier for controlling the switching on of the current source motor amplifier for a predetermined time to operate the top half of the H bridge configuration essentially as a linear constant current source and the bottom half of the H bridge configuration in switching mode.

Through the present invention, significant current loop delays associated with conventional approaches are avoided. Further, the present invention provides a less complex and less costly solution that includes overvoltage protection and is more suitable for high fidelity force feedback when changing direction of motor rotation. The present invention also provides for a simple means of motor back EMF compensation. These and other advantages will become readily apparent from the following detailed description and accompanying drawings.

DETAILED DESCRIPTION OF THE INVENTION

The present invention relates to a current controlled motor amplifier system. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

Figure 1:
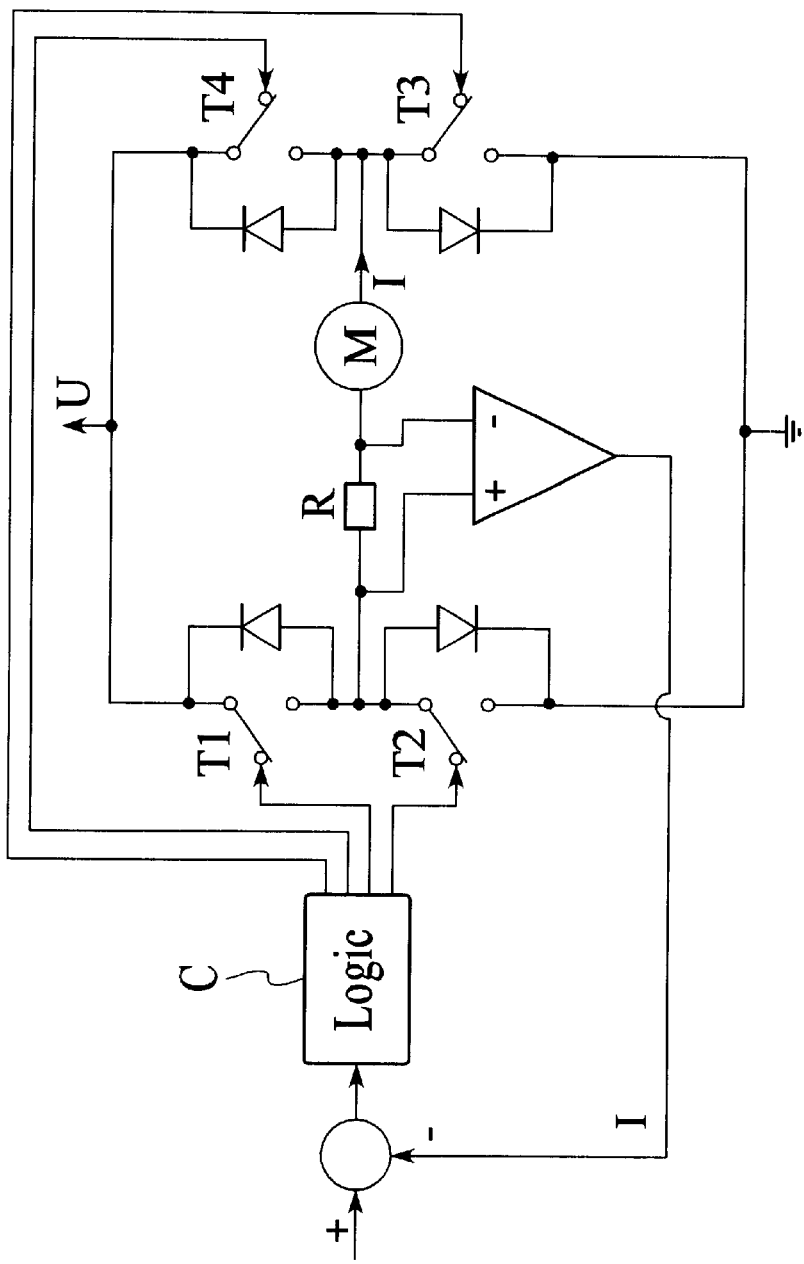
FIG. 1 illustrates a diagram of a prior art motor amplifier design.
Figure 2:
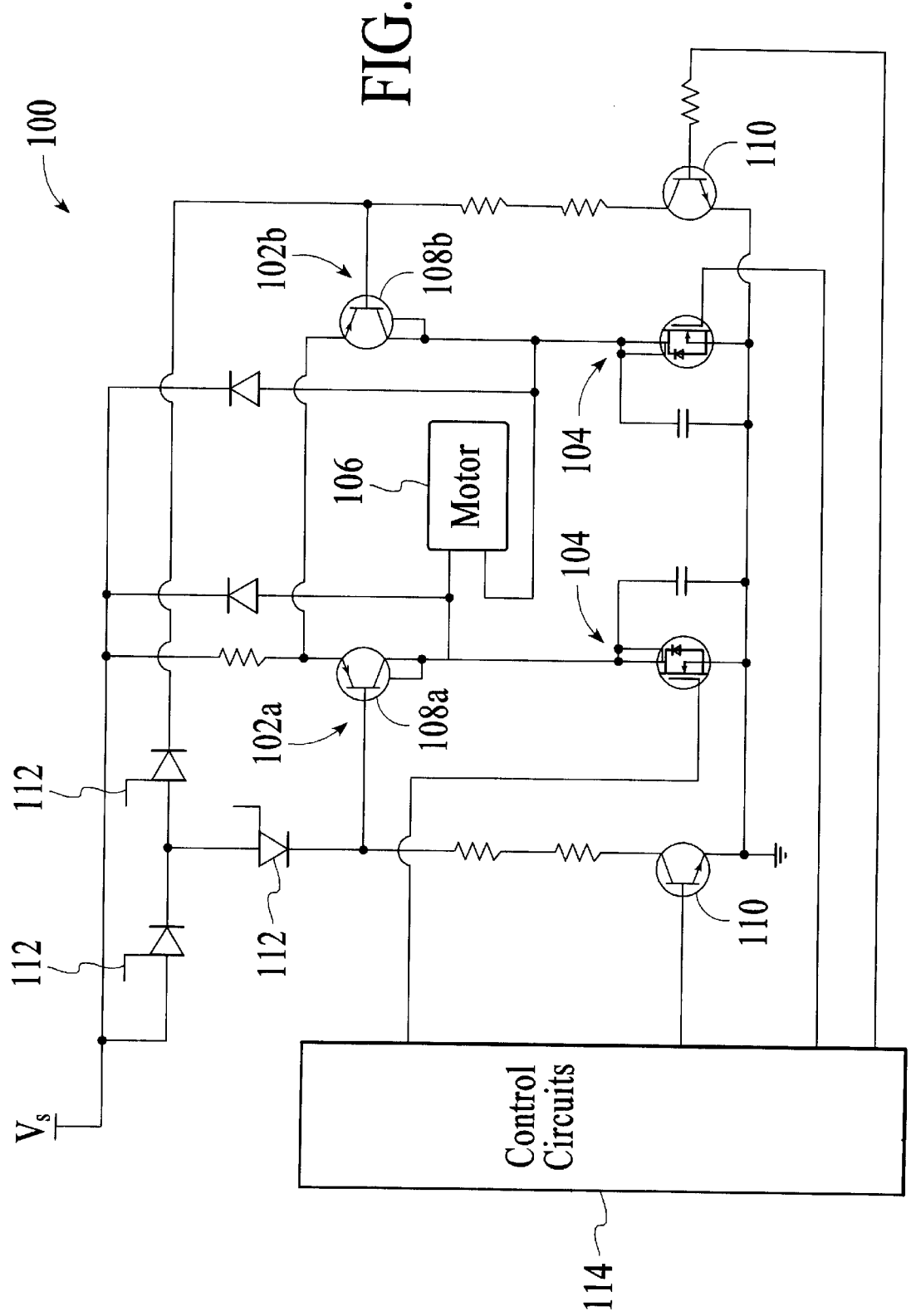
FIG. 2 illustrates a schematic diagram of a current source motor amplifier in accordance with the present invention.

FIG. 2 illustrates a schematic diagram of a current source motor amplifier 100 in accordance with the present invention. In general, the design is a hybrid between a linear amplifier and a switched-mode amplifier, with the smooth current linearity of a linear amplifier and efficiency that lies between a linear and switched-mode amplifier.

As shown in FIG. 2, the current source motor amplifier 100 in accordance with the present invention is based on a current sourcing topology. An H bridge includes current sources 102a and 102b on each leg of the top of the bridge and switching mechanisms 104, e.g., N-channel FETs (field effect transistor), on each leg of the bottom of the bridge with the motor 106 lying in the horizontal portion of the H bridge. One current source is used for each of the two force directions of the motor 106, e.g., current source 102a for a forward direction, and current source 102b for a reverse direction. Appropriate biasing via base resistance Rb and transistors 110, operates with transistors 108a and 108b, e.g., PNP bipolar junction transistors (BJTs), to provide current sources 102a and 102b. A pair of the forward biased diodes 112 prevents the base voltage of the current sources from falling below the supply voltage minus two voltage drops, as is well appreciated by those skilled in the art.

Thus, for a nominal 12 V (volt) supply, the base voltage of transistor 102 does not fall below 12 V−2*0.7 V=10.6 V. This controls the emitter voltage to one diode drop above the base voltage, or 10.6 V+0.7 V=11.3 V. The voltage drop across the current controlling resistor, Rs, from the supply to the emitter is therefore controlled to 0.7 V nominally. This fixed voltage drop allows a fixed current to pass through the current controlling resistor. The base resistance Rb=(Vs−2*0.7−Vsat)/(Imax/β)/Ksf; where Vs is the maximum supply voltage, Vsat is the NPN collector to emitter saturation voltage of transistor 110, Imax is the peak PNP emitter current, B is the minimum PNP device gain, and Ksf is the design safety factor. For a typical application, Vs=12 V, Vsat=0.4 V, Imax=750 mA (milliAmps), $\beta$=50, and Ksf=2. Thus, Rb=approximately 340 ohms, or 330 ohms as a nominal value. The source resistance, Rs,=0.7 V/[(1−1/$\beta$) Imax] or approximately 0.952 ohms, nominally 1 ohm.

In operation, a current source 102 is turned on by pulling the base of the appropriate transistor low. By way of example, control circuitry 114 may include a controller capable of sending direction signals to a multiplexer (MUX) for the selection of which current source is turned on, and, further, the control of which of the switching transistors is allowed to be modulated (switched on) by a PWM (pulse width modulate) force command. Preferably, only one current source 102 and switching mechanism 104 in the bridge are active at a time, where the one current source 102 and switching mechanism 104 that are active lie diagonally from one another in the bridge. In operation, the current is sourced from the transistor of the selected current source 102, flows through the motor header to the motor winding and returns to ground through the selected switching mechanism 104 on the bottom of the H bridge. Since the gate of the transistor of the switching mechanism 104 is modulated, it conducts for only the portion of the PWM period in which the signal is high. Since a return path to the power supply is only available for the positive portion on the PWM cycle, the current source provides current only for that portion of the PWM cycle, thus controlling the average current through the motor and thereby the torque generated by the motor, as is well appreciated by those skilled in the art.

Figure 3:
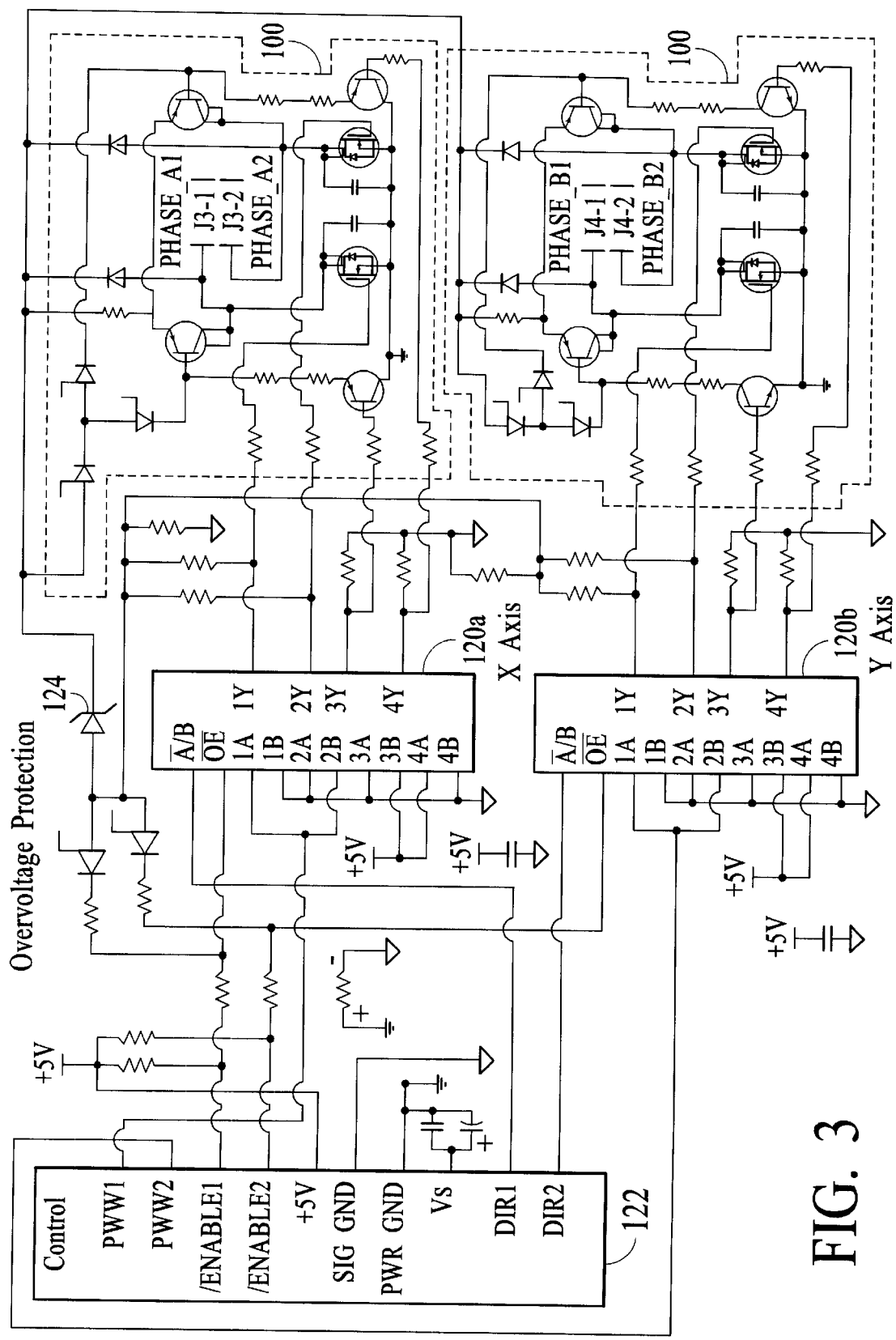
FIG. 3 illustrates a schematic diagram of an example application of the current source motor amplifier of FIG. 2 in a two axis (X and Y), high current amplifier situation, such as a joystick amplifier in an arcade application.

FIG. 3 illustrates a schematic diagram of an example application of the current source motor amplifier of FIG. 2 in a two axis (X and Y), high current amplifier situation, such as a joystick amplifier in an arcade application. The diagram of FIG. 3 illustrates an example embodiment of the control circuitry that includes a MUX 120a and 120b on each of the X and Y axes. The MUX 120a or 120b is required in normal operation and operates by channeling the PWM signal from a controller 122 to either the right or left switching mechanism 104 based on the direction signal for the axis from the controller. The opposite switching mechanism is grounded appropriately based on the sense of the direction signal. Likewise the MUX 120a or 120b turns on one of the current source transistors on the top of the bridge while the enable signal from the controller is low.

While operating successfully as a current source amplifier, a further aspect is the ability to drive the motor with either a clockwise or counter-clockwise torque depending upon whether the motor is rotating clockwise or counterclockwise, i.e., four quadrant operation. The amplifier therefore makes a smooth transition between forward driving the motor and dynamically braking the motor. This occurs when the current source amplifier senses motor back-EMF, such as when the actuator is driven by the user and the motor is rotating in a direction that is opposed to the commanded torque direction, which in turn causes the motor to act as a generator that produces an output voltage proportional to the rotational velocity of the motor.

Figure 4:
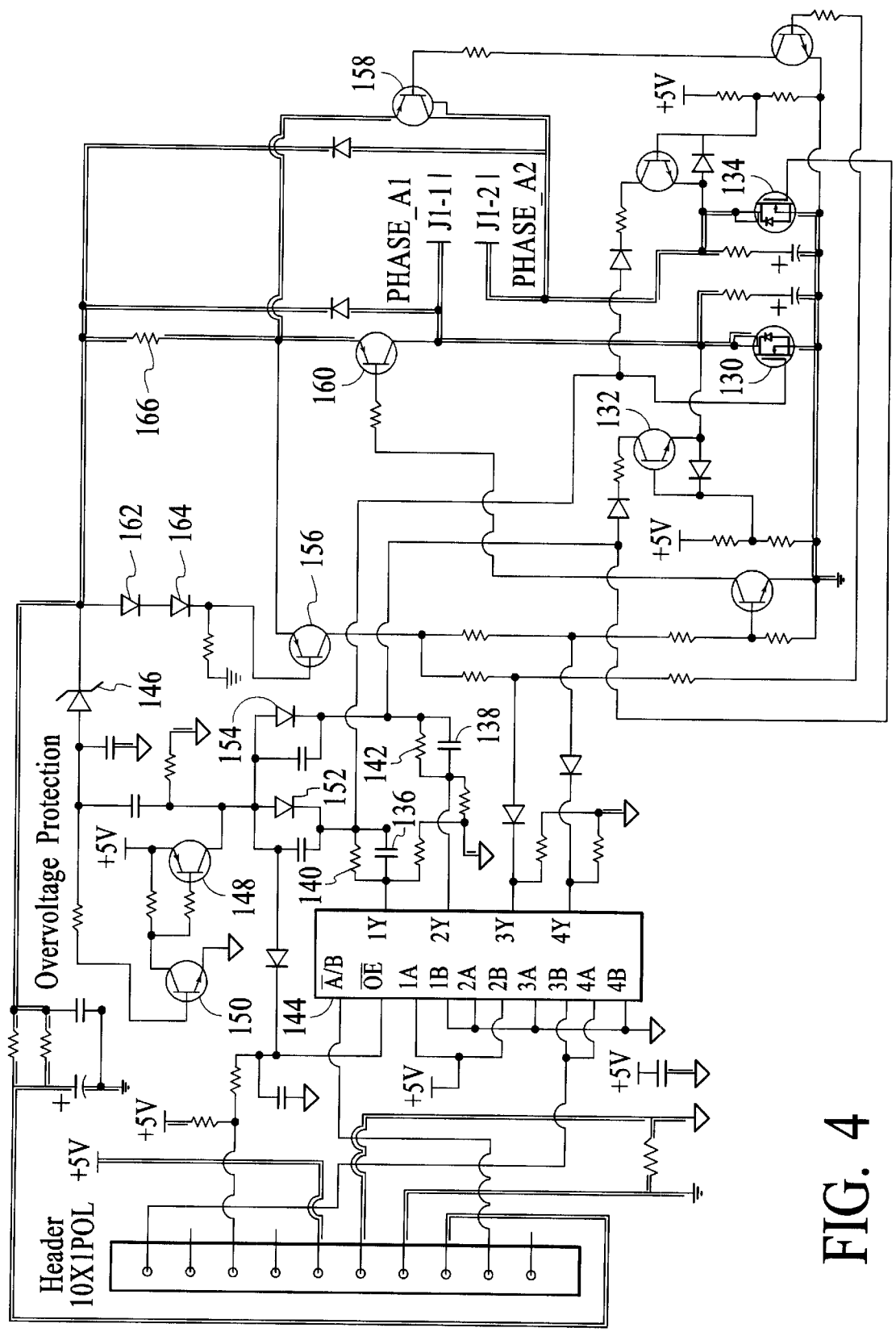
FIG. 4 illustrates a variant of the current source motor amplifier that includes back EMF compensation and high current motor drive capability.

FIG. 4 illustrates a variant of the current source amplifier that is intended for applications, such as steering wheel force-feedback devices, that use high mechanical gearing between the motor and steering wheel, where the effects of the motor velocity require compensatory circuitry. The current source amplifier is designed to protect itself against back EMF generated by the user back-driving the motor through a reduction in the commanded motor current when the onset of the body diode conduction in the switching transistor 130 is detected by transistor 132. Transistor 132 begins to conduct when its emitter voltage drops below the biased voltage of the base, which is close to ground. Since the anode of the body diode of transistor 130 is at ground potential, when it is induced to conduct by the motor, its cathode and hence the emitter of transistor 132 is brought below ground, causing the collector of transistor 132 to conduct.

Note that the drive signal for the switching FETs 130 and 134 is capacitively coupled by capacitors 136 and 138 and weakly driven in parallel by resistors 140 and 142. This ensures that the FETs 130 and 134 are able to conduct for a minimum duration at the leading edge of the PWM command signal from MUX 144. This further ensures that no current pulses are dropped, so that the amplifier always operates at a frequency that is above the audible range, and thus, prevents audible noise from being generated in the motor. The weak resistive coupling of the drive signal also ensures that after the initial turn-on pulse, the back EMF compensation circuitry can effectively regulate the duration of the commanded pulse and hence the induced damping generated by the motor back EMF.

When transistor 132, for example, detects body diode conduction in switching transistor 130, the collector of 132 then discharges capacitor 138 and prematurely terminates the command signal that drives the gate of switching transistor 134. The net result is that body diode conduction in one FET on the bottom of the bridge causes a compensatory reduction in the complementary FET on the opposite side of the bridge that virtually eliminates the electrical damping induced by the motor back EMF when the motor is back-driven. This innovation eliminates the sensation of resistance that is felt by the user and detracts from the haptic experience. The same functionality could likewise be accomplished with a bipolar transistor and a diode placed from emitter to collector similar to the body diode in the FET from source to drain, as is well appreciated by those skilled in the art.

FIG. 4 illustrates an additional aspect of the design that is different from the embodiment in FIG. 3. Current sensing transistor 156 provides the current source regulation that is independent of the base to emitter voltage of the power transistors 158 and 160. This is important in higher current applications as the base to emitter voltage of the power transistors varies significantly as a function of collector current and much more than the emitter to base voltage drop of the small signal transistor that is used for current sensing. By biasing the base of transistor 156 with diodes 162 and 164, the collector current of transistor 156 depends almost exclusively on the voltage drop across resistor 166, and hence the collector current of the enabled power transistor 158 or 160.

In still a further aspect, overvoltage protection is readily achieved in the current source amplifier. As shown in the diagram of FIG. 3, in an exemplary embodiment, a zener diode 124 is used to detect an over-voltage condition and trigger a series of events that protect the bridge. Once detected, a high logic level voltage places the outputs of the MUX 120a or 120b into a tri-state condition. Secondly, both of the switching transistors on the bottom of the bridge are turned on and the current sources on the top of the bridge are disabled. Accordingly, a low impedance current path is placed across the motor through the ground plane and shorts out the motor, which is the source of voltage. When the supply voltage drops, the overvoltage protection circuit releases the MUX 120 from its tri-state condition, and normal operation continues. In practice, when the user is back-driving the motor with sufficient velocity to generate an overvoltage condition, the amplifier will rapidly (on the order of a few hundred microseconds) toggle between normal mode and overvoltage protection mode such that the motor voltage is clamped.

In the exemplary circuit in FIG. 4, a signal conditioning circuit, including diode 146, transistor 148, transistor 150, and associated passive components, generates a 5 volt signal at the collector of transistor 148 that both causes the output of MUX 144 to drive its outputs low, disables the top of the bridge through diodes 152 and 154 and turns on both FETs 130 and 134 on the bottom of the bridge. Thus, rather than using a separate crowbar overvoltage protection circuit, as is used in prior art, the bridge power components can provide the overvoltage protection function. An alternative embodiment uses the transistors on the top of the bridge to likewise circulate induced motor current through the positive supply rail.

As demonstrated by these aspects, with the current source amplifier of the present invention, the top half of the bridge is essentially a linear constant current source and the bottom half of the bridge operates in switching mode. This gives the current source amplifier the clean linearity of a linear amplifier but with a higher efficiency that is more characteristic of a pure switch-mode amplifier. Amplifier linearity is also maintained when used with high power PNP transistors. Further, the current source amplifier operates in current mode and is a transconductance amplifier, but does not require classic closed loop current control, saving considerable complexity and cost while avoiding current loop delays. Additional reduction in complexity and cost results from achieving overvoltage protection via the switching transistors on the bottom of the bridge, rather than requiring a separate crowbar circuit, as is needed in standard transconductance amplifiers. Thus, the design is scalable, simple, and low cost.

This simplified design also improves the dynamic range of the motor by decreasing the minimum command at which proportional output current is provided. In a 750 mA application, the design provides for linear output current for current commands of as little as 5 mA and non-zero output current for current commands of as little as one part in 1024 of PWM command. This provides a clean transition through a direction reversal without the notch sensation of dropout through the zero crossing that is associated with other low cost amplifier designs.

From the foregoing, it will be observed that numerous variations and modifications may be effected without departing from the spirit and scope of the novel concept of the invention. It is to be understood that no limitation with respect to the specific methods and apparatus illustrated herein is intended or should be inferred. For example, although the present invention is described in terms of current sources on the top of the bridge, an alternate embodiment could use current sinks on the bottom of the bridge to achieve the aspects of the controlled motor amplifier as described herein. It is, of course, intended to cover by the appended claims all such modifications as fall within the scope of the claims.

What is claimed is:

1. A method, comprising:
   providing a substantially constant current source on each leg of a top half of an H bridge configuration;
   providing a switch on a bottom half of each leg of the H bridge configuration;
   switching on the substantially constant current source for a predetermined time and an appropriate switch to operate the top half of the H bridge configuration essentially as a linear substantially constant current source and the bottom half of the H bridge configuration in switching mode; and
   achieving overvoltage protection in the current controlled motor amplifier by:
      disabling the substantially constant current source on each leg;
      enabling power transistors on each side of the H bridge configuration;
      inducing a circulation current through a ground plane to limit back EMF induced motor voltage;
      dissipating the back EMF induced motor voltage in a motor winding via the circulation current; and
      including signal conditioning circuitry to control a duration of the overvoltage protection.

2. An apparatus, comprising:
   a first current source coupled to a first terminal of an H-bridge amplifier configuration, the first current source being configured to operate substantially in a linear mode;
   a second current source coupled to a second terminal of the H-bridge amplifier configuration, the second current source being configured to operate substantially in a linear mode;
   a first switching component coupled to a third terminal of the H-bridge amplifier configuration, the first switching component being associated with the first current source, and the first switching component being configured to operate in a switching mode;
   a second switching component coupled to a fourth terminal of the H-bridge amplifier configuration, the second switching component being associated with the second current source, and the second switching component being configured to operate in a switching mode; and
   a control circuitry coupled to each of the first switching component and the second switching component, the control circuitry being configured to activate the first switching component and the second switching component during discrete time intervals, the first current source configured to provide a first directional current to a load coupled to the first current source and to the first switching component in response to activation from the control circuitry, and the second current source configured to provide a second directional current to a load coupled to the second current source and to the second switching component in response to activation from the control circuitry.

3. The apparatus of claim 2, wherein the first current source includes at least one transistor configured to provide current in a forward direction, and the second current source includes at least one transistor configured to provide current in a reverse direction.

4. The apparatus of claim 3, wherein each of the transistors of the first current source and the second current source includes a bipolar junction transistor.

5. The apparatus of claim 2, wherein each of the first switching component and the second switching component includes a field effect transistor.

6. The apparatus of claim 2, wherein the control circuitry includes a controller coupled to the H-bridge configuration, the control circuitry being configured to provide selection signals to the first current source and the second current source, and the first switching component and to the second switching component.

7. The apparatus of claim 6, wherein the control circuitry includes a multiplexer coupled to the controller and the H-bridge configuration, the controller and multiplexer collectively configured to provide selection signals to the first current source and the second current source, and to the first switching component and the second switching component.

8. The apparatus of claim 2, further comprising:
a forward-biased diode coupled to the first current source; and
a forward-biased diode coupled to the second current source.

9. The apparatus of claim 2, further comprising:
an overvoltage protection circuitry configured to induce a circulation current through a ground plane, and to dissipate back EMF experienced by a load.

10. An amplifier, comprising:
a first current source means coupled to a first terminal of an H-bridge amplifier configuration, the first current source means being configured to operate substantially in a linear mode;
a second current source means coupled to a second terminal of the H-bridge amplifier configuration, the second current source means being configured to operate substantially in a linear mode;
a first switching means coupled to a third terminal of the H-bridge configuration, the first switching means being associated with the first current source means, and the first switching means being configured to operate in a switching mode; and
a second switching means coupled to a fourth terminal of the H-bridge configuration, the second switching means being associated with the second current source means, and the second switching means being configured to operate in a switching mode.

11. The amplifier of claim 10, wherein the first current source means includes at least one transistor configured to provide a current in a forward direction, and the second current source means includes at least one transistor configured to provide current in a reverse direction.

12. The amplifier of claim 11, wherein each of the transistors of the first current source means and the second current source means includes a bipolar junction transistor.

13. The amplifier of claim 10, wherein each of the first switching means and the second switching means includes a field effect transistor.

14. The amplifier of claim 10, further comprising:
means for selectively activating each of the first switching means and the second switching means.

15. The amplifier of claim 14, wherein the means for selectively activating provides selection signals to each of the first current source means, the second current source means, the first switching means, and the second switching means to enable the first current source means and the second current source means to alternately provide respective currents in a forward direction and a reverse direction.

16. The amplifier of claim 10, further comprising:
a forward-biased diode coupled to the first current source means; and
a forward-biased diode coupled to the second current source means.

17. A method, comprising:
sourcing current to a first terminal of an H-bridge amplifier configuration, the current sourced to the first terminal being sourced in a linear mode;
sourcing current to a second terminal of the H-bridge amplifier configuration, the current sourced to the second terminal being sourced in a linear mode;
switching a state of a third terminal of the H-bridge amplifier configuration, the third terminal being associated with the first terminal;
switching a state of a fourth terminal of the H-bridge amplifier configuration, the fourth terminal being associated with the second terminal;
alternating the state of the third terminal and the state of the fourth terminal such that the third terminal and the fourth terminal are each activated during different time intervals;
providing the current sourced to the first terminal to a load in a first direction when the third terminal is activated; and
providing the current sourced to the second terminal to a load in a second direction when the fourth terminal is activated.

18. The method of claim 17 wherein the first terminal is located diagonally from the third terminal in the H-bridge configuration and wherein the second terminal is located diagonally from the fourth terminal in the H-bridge configuration.

19. The method of claim 17, wherein the providing current sourced to the first terminal to a load includes providing current from at least one transistor in a forward direction, and wherein the providing current sourced to the second terminal includes providing current from at least one transistor in a reverse direction.

20. The method of claim 19, wherein the providing current sourced to the first terminal includes providing current from at least one bipolar junction transistor, and wherein the providing current sourced to the second terminal includes providing current from at least one bipolar junction transistor.

21. The method of claim 17, wherein the switching the state of the third terminal includes activating a field effect transistor and the switching the state of the fourth terminal includes activating a field effect transistor.

22. The method of claim 17, further comprising:
protecting a load from an overvoltage condition by:
disabling the current sourced to the first terminal and the current sourced to the second terminal;
inducing a circulation current through a ground plane; and
dissipating any back EMF voltage via the induced circulation current.

23. The method of claim 22, further comprising:
controlling a duration of the protecting a load from an overvoltage condition according to control signals.

24. The method of claim 22, further comprising:
compensating for back EMF voltage.

25. The method of claim 24, wherein the compensating includes:
detecting a body diode conduction in a provided switch;
capacitively coupling a drive signal to the provided switch; and
prematurely terminating the drive signal to the provided switch on an opposite terminal of the H-bridge configuration.

26. The method of claim 17, further comprising:
regulating current provided by at least one-high power transistor independent of emitter-to-base voltage drops of the at least one-high power transistor.

27. Apparatus, comprising:
a first current source coupled to a first terminal of an H-bridge amplifier configuration, the first current source being configured to operate substantially in a linear mode;

a second current source coupled to a second terminal of the H-bridge amplifier configuration, the second current source being configured to operate substantially in a linear mode;

a first switch coupled to a third terminal of the H-bridge amplifier configuration, the first switch being associated with the first current source, the first switch being configured to operate in a switching mode; and a second switch coupled to a fourth terminal of the H-bridge configuration, the second switch being associated with the second current source, the second switch being configured to operate in a switching mode.

28. The apparatus of claim 27, further comprising:

a control system configured to selectively activate a current source from the first current source and the second current source and to control which switch from the first switch and the second switch is activated.

29. The apparatus of claim 28, wherein the control system includes:

a controller and a multiplexer coupled to the H-bridge configuration, the controller and multiplexer being configured to collectively provide selection signals for each current source selected from the first current source and the second current source and each switch selected from the first switch and the second switch.

* * * * *